US008166469B2

(12) United States Patent
Milner (10) Patent No.: US 8,166,469 B2
(45) Date of Patent: Apr. 24, 2012

(54) METHOD AND AN APPARATUS TO CONDUCT SOFTWARE RELEASE

(75) Inventor: Stephen D. Milner, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1266 days.

(21) Appl. No.: 11/894,363

(22) Filed: Aug. 20, 2007

(65) Prior Publication Data
US 2009/0055819 A1    Feb. 26, 2009

(51) Int. Cl.
*G06F 9/44*       (2006.01)
*G06F 15/173*  (2006.01)

(52) U.S. Cl. ........ 717/168; 717/177; 717/178; 709/223; 709/225

(58) Field of Classification Search ................ None
See application file for complete search history.

(56) References Cited

U.S. PATENT DOCUMENTS

| | | | |
|---|---|---|---|
| 7,058,941 B1* | 6/2006 | Venkatesan et al. | 717/168 |
| 7,322,028 B2* | 1/2008 | Belovich | 717/168 |
| 7,469,405 B2* | 12/2008 | Foulger et al. | 718/100 |
| 7,500,236 B2* | 3/2009 | Janzen | 717/174 |
| 7,555,749 B2* | 6/2009 | Wickham et al. | 717/168 |
| 7,681,190 B2* | 3/2010 | Venkatesan et al. | 717/168 |
| 7,685,590 B2* | 3/2010 | Venkatesan et al. | 717/168 |
| 7,735,078 B1* | 6/2010 | Vaidya | 717/171 |
| 7,797,403 B2* | 9/2010 | Vedula et al. | 709/220 |
| 2002/0099761 A1* | 7/2002 | Wang | 709/200 |
| 2002/0100036 A1* | 7/2002 | Moshir et al. | 717/173 |
| 2002/0174422 A1* | 11/2002 | Kelley et al. | 717/178 |
| 2003/0145210 A1* | 7/2003 | Taylor | 713/182 |
| 2003/0233648 A1* | 12/2003 | Earl et al. | 717/176 |
| 2004/0078781 A1* | 4/2004 | Novy et al. | 717/114 |
| 2006/0156296 A1* | 7/2006 | Goldberg | 717/168 |
| 2006/0206890 A1* | 9/2006 | Shenfield et al. | 717/174 |
| 2006/0224720 A1* | 10/2006 | Bhogal et al. | 709/224 |
| 2007/0226302 A1* | 9/2007 | Provo | 709/206 |
| 2008/0109547 A1* | 5/2008 | Bao et al. | 709/224 |
| 2008/0127162 A1* | 5/2008 | Xu et al. | 717/168 |
| 2008/0127169 A1* | 5/2008 | Malasky et al. | 717/174 |
| 2008/0127170 A1* | 5/2008 | Goldman et al. | 717/174 |
| 2008/0320465 A1* | 12/2008 | Kinder et al. | 717/170 |

OTHER PUBLICATIONS

Jason E. Robbins, Adopting Open Source Software Engineering (OSSE) Practices by Adopting OSSE Tools, 2003 [online], retrieved on Dec. 14, 2011. Retrieved from Internet: <URL: http://www.dtic.upf.edu/~parumi/EngPL/Robbins-AdoptingFSETools.pdf>.*
Camenisch et al., A Card Requirements Language Enabling Privacy-Preserving Access Control, Jun. 9-11, 2010 [online], retrieved on Dec. 14, 2011. Retrieved from Internet: <URL: http://delivery.acm.org/10.1145/1810000/1809863/p119-camenisch.pdf?>.*

(Continued)

*Primary Examiner* — Thuy Dao
*Assistant Examiner* — Hanh Bui
(74) *Attorney, Agent, or Firm* — Lowenstein Sandler PC (57) ABSTRACT

Some embodiments of a method and an apparatus to conduct software release have been presented. In one embodiment, a user submits a request to conduct software release on a set of servers. Each of the servers has a distinct platform. In response to the request, a set of commands in a cross-platform language is sent to the servers via remote procedure calls (RPCs) in a transactional format.

17 Claims, 6 Drawing Sheets

OTHER PUBLICATIONS

Topic: Python, from Wikiversity. http://en.wikiversity.org/wiki/Topic:Python. Jul. 25, 2007. 3 pages.

R. Srinivasan, "RFC 1831 RPC: Remote Procedure Call Protocol Specification Version 2." Network Working Group, Sun Microsystems, Aug. 1992. 18 pages.

Remote Procedure Call, from Wikipedia, the free encyclopedia. http://en.wikipedia.org/wiki/Remote_procedure_call. Jun. 26, 2007. 3 pages.

Release Engineering, from Wikipedia, the free encyclopedia. http://en.wikipedia.org/wiki/Release_engineering Jun. 14, 2007. 2 pages.

Build Automation, from Wikipedia, the free encyclopedia. http://en.wikipedia.org/wiki/Build_automation Jun. 14, 2007. 3 pages.

About Python. http:www.python.org/about/. Jun. 14, 2007. 2 pages.

Python Programming/Print Version from Wikibooks, the open-content textbooks collection. http://en.wikibooks.org/wiki/Python_Programming/Print_version. Jul. 25, 2007. 89 pages.

\* cited by examiner

FIG. 1A

```
18  """
19  One example on how to release software """
21  from xmlrpclib import ServerProxy, Error
22
23  if __name__ == "__main__":
24      # Connect to the server
25      # Standalone style
26      server = ServerProxy("http://127.0.0.1:8000")
27      # apache style via cgibin
28      #server = ServerProxy("http://127.0.0.1/cgi-bin/RECommandd/")
29
30      try:
31          # print out all available methods using direct connection
32          print server.system.listMethods()
33          print "Get the uptime using a call"
34          print server.call("uptime", "", "username","password")
35          print server.sys.uptime()
36          print server.whiteList
37      except Error, v:
38          # oops an error occurred
39          print "ERROR", v
```

RECEIVE A COMMAND FROM A RELEASE APPARATUS 150

EXECUTE THE COMMAND 152

SEND RESULT OF EXECUTION TO THE RELEASE APPARATUS 154

FIG. 1B

```
Sample Plan Script

1   # comment
2   # Here we define a server we will call LOCAL
3   LOCAL username=username password=password server=http://127.0.0.1:8000
4   BEAV username=000327 password=DHWxw1WJYc8w server=http://beav.rdu.redhat.com:8000
5   # First Transaction
6   1TRANSACTION print Uptime for 127.0.0.1
7   1TRANSACTION execute LOCAL fakedoesnotexits
8   1TRANSACTION print next thing
9   1TRANSACTION execute LOCAL uptime
10  1TRANSACTION failure print Uptime for 127.0.0.1 FAILED!!!!
11  1TRANSACTION failure execute BEAV uptime
12  1TRANSACTION failure print Wow this sucks
13  1TRANSACTION failure print oh well
14  # Second Transaction
15  2TRANSACTION print RPM List for recon on 127.0.0.1
16  2TRANSACTION execute LOCAL rpmList recon
17  2TRANSACTION failure print RPM List Failed for 127.0.0.1
```

023 # METHOD AND AN APPARATUS TO CONDUCT SOFTWARE RELEASE

TECHNICAL FIELD

Embodiments of the present invention relate to release engineering, and more specifically to conducting software release.

BACKGROUND

Software release generally refers to the distribution of a new or an upgraded version of computer software, which may include a program or a suite of programs. Software release may occur in a wide variety of environments, such as, for example, in quality assurance (QA), manufacturing, etc. In a typically release, the new or upgraded software is deployed to many machines, which include local and/or remote machines (e.g., servers, workstations, personal computers, special-purpose machines, such as cellular telephones, appliances, and set-top boxes, etc.). Furthermore, the machines may or may not have different platforms. A platform as used herein broadly refers to a combination of hardware and/or software to execute software applications. For example, a platform may include an operating system of the machine, programming environment of the machine, computer architecture of the machine, etc. Some examples of platforms include Linux®, Microsoft® Windows®, Solaris®, Mac OS® X, etc. For instance, software written in Java is likely to be deployed to machines having different platforms.

Different platforms typically work with different application programming interfaces (APIs). Thus, a release engineer conventionally has to manually log onto the machines having different platforms to input one or more commands in order to deploy the new or upgraded software properly. Furthermore, when the software release has to be conducted in a transactional format, the release engineer has to wait for the execution result of a transaction on one or more machines such that, if there is an error or failure on one of the machines, the release engineer may recover the error or failure by sending the appropriate commands to the machine having the error. Thus, the release of software to machines having different platforms may be a tedious and labor-intensive task.

DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to conduct software release. In some embodiments, a user submits a request to conduct software release on a set of servers. Each of the servers has a distinct platform. In response to the request, a release apparatus may send a set of commands in a cross-platform language to the servers via remote procedure calls (RPCs) in a transactional format. A transaction generally refers to a series of interaction between two entities or objects, which may include exchange of information. To send the commands in a transactional format, the release apparatus may send a command based on a response received from a server. For example, if a response from a server indicates that a previous command has failed, then the release apparatus sends a command to recover from the failure. The RPC allows the commands to be remotely executed by the servers. Note that the RPC may be referred to as remote method invocation in some embodiments.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
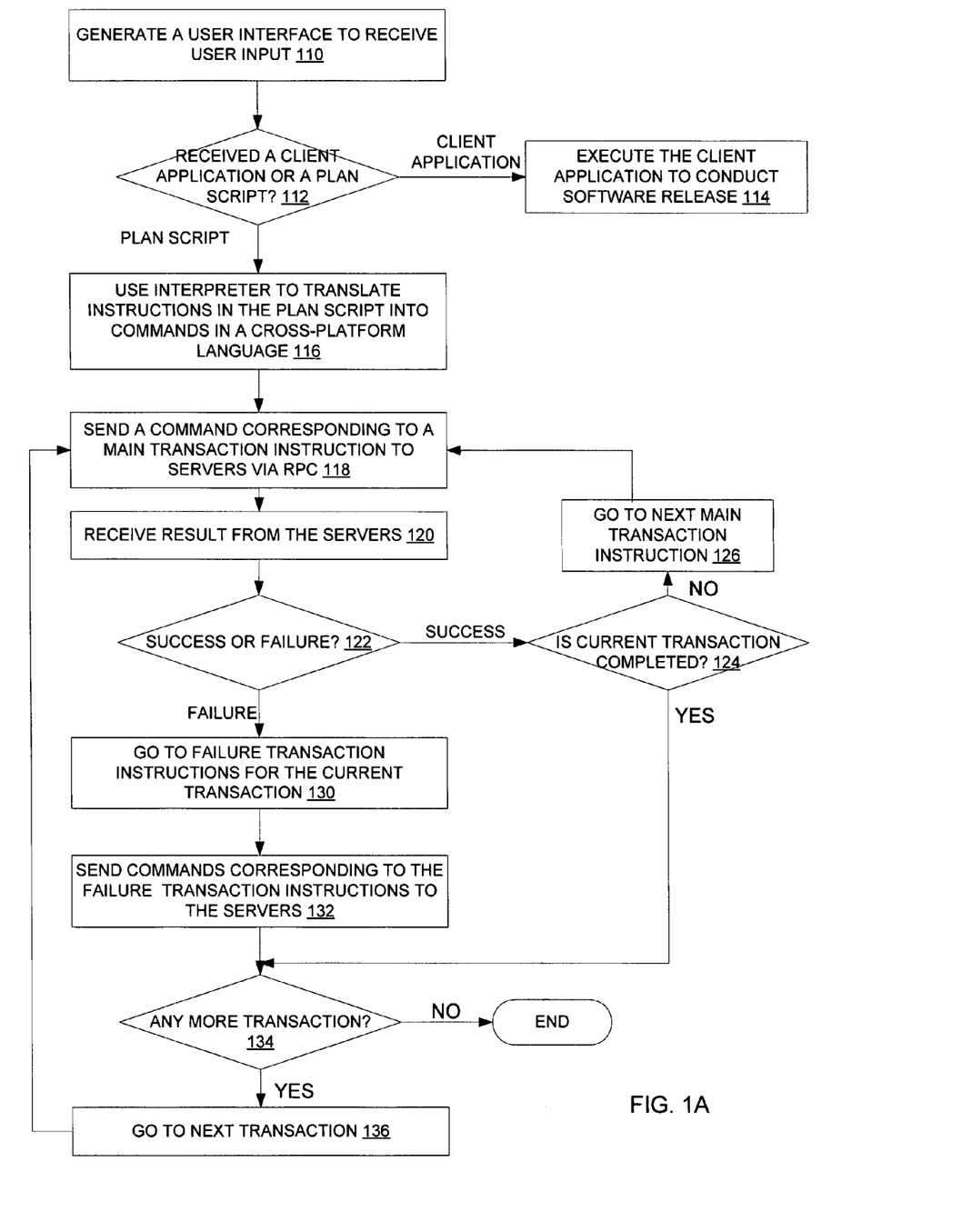
FIG. 1A illustrates one embodiment of a process to conduct software release.

FIG. 1A illustrates one embodiment of a process to conduct software release from a release apparatus. The process may be performed by processing logic that may comprise hardware (e.g., circuitry, dedicated logic, programmable logic, microcode, etc.), software (such as instructions run on a processing device), firmware, or a combination thereof. For example, the processing device 220 of the release apparatus 200 shown in FIG. 2 may perform at least part of the process.

Processing logic generates a user interface to receive user input (processing block 110). In some embodiments, the user interface may be presented to a user via a display device (e.g., a monitor) coupled to the release apparatus. Alternatively, the user interface may be presented via a network access application (e.g., a web browser) on a client device remotely coupled to the release apparatus via a network (e.g., an intranet, the Internet, etc.). In some embodiments, the user input includes a request to conduct software release to multiple servers communicatively coupled to the release apparatus. Note that the servers may have different platforms, such as Linux, Windows, UNIX, Mac, etc.

Processing logic then checks to determine if the user further provides a client application or a plan script (processing block 112). If the user provides a client application, processing logic may execute the client application to conduct software release (processing block 114). The client application may specify a particular server acting as a release apparatus and instruct the server to send commands via RPCs to other servers. In some embodiments, the client application is written in a cross-platform language. A cross-platform language is a programming language supported by multiple platforms, such as Python. An exemplary client application 1000 is shown in FIG. 1C.

Figure 1B:
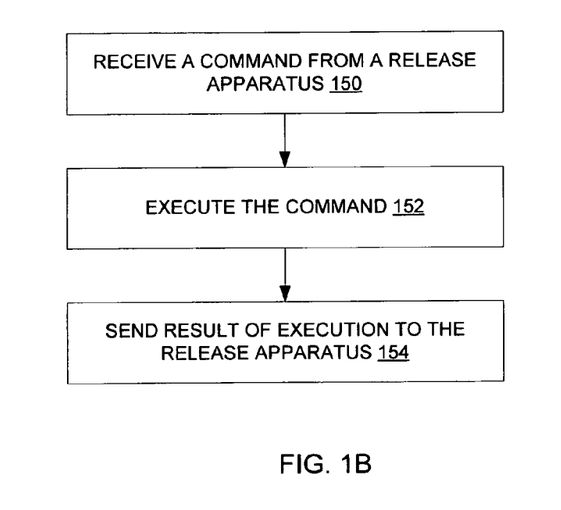
FIG. 1B illustrates one embodiment of a process to respond to a command in software release.
Figure 1C:
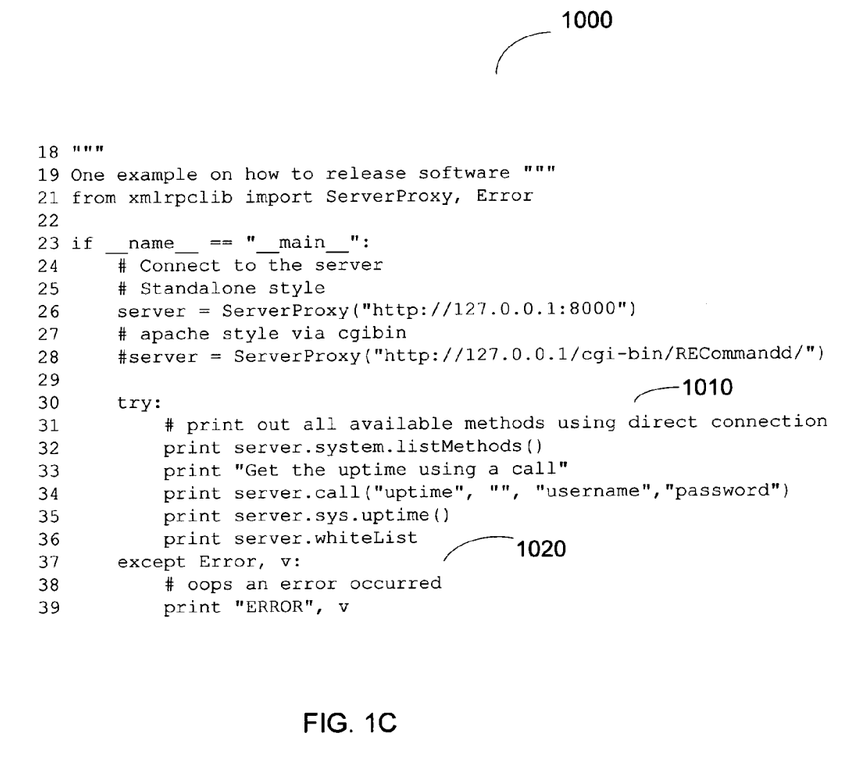
FIG. 1C illustrates one exemplary client application.

Referring to FIG. 1C, the client application 1000 connects to a server at "http://127.0.0.1:8000." Then the client application 1000 instructs the servers to execute the commands 1010. If there is an error in executing any of the commands 1010 on a server, the client application 1000 instructs the server to execute the error commands 1020.

Referring back to FIG. 1A, if the user provides a plan script instead of the client application, then processing logic uses an interpreter to translate instructions in the plan script into commands in a cross-platform language, such as Python (processing block 116). The plan script allows for simple batching of remote commands, and thus, the plan script eliminates the hassle of manually inputting individual commands for each of the servers. Furthermore, the plan script may be used repeatedly, thus, making the process repeatable on different servers and/or at different times. For instance, the same plan script may be executed multiple times on different servers simply by changing the server variables in the plan script. In some embodiments, the plan script may be written in a predetermined format while the interpreter is written in the cross-platform language as well. As such, the user may not even need to know any existing programming language as long as the user can compose the plan script in the predetermined format, which may or may not be proprietary. The interpreter may translate the plan script from the predetermined format into the cross-platform language.

Figure 1D:
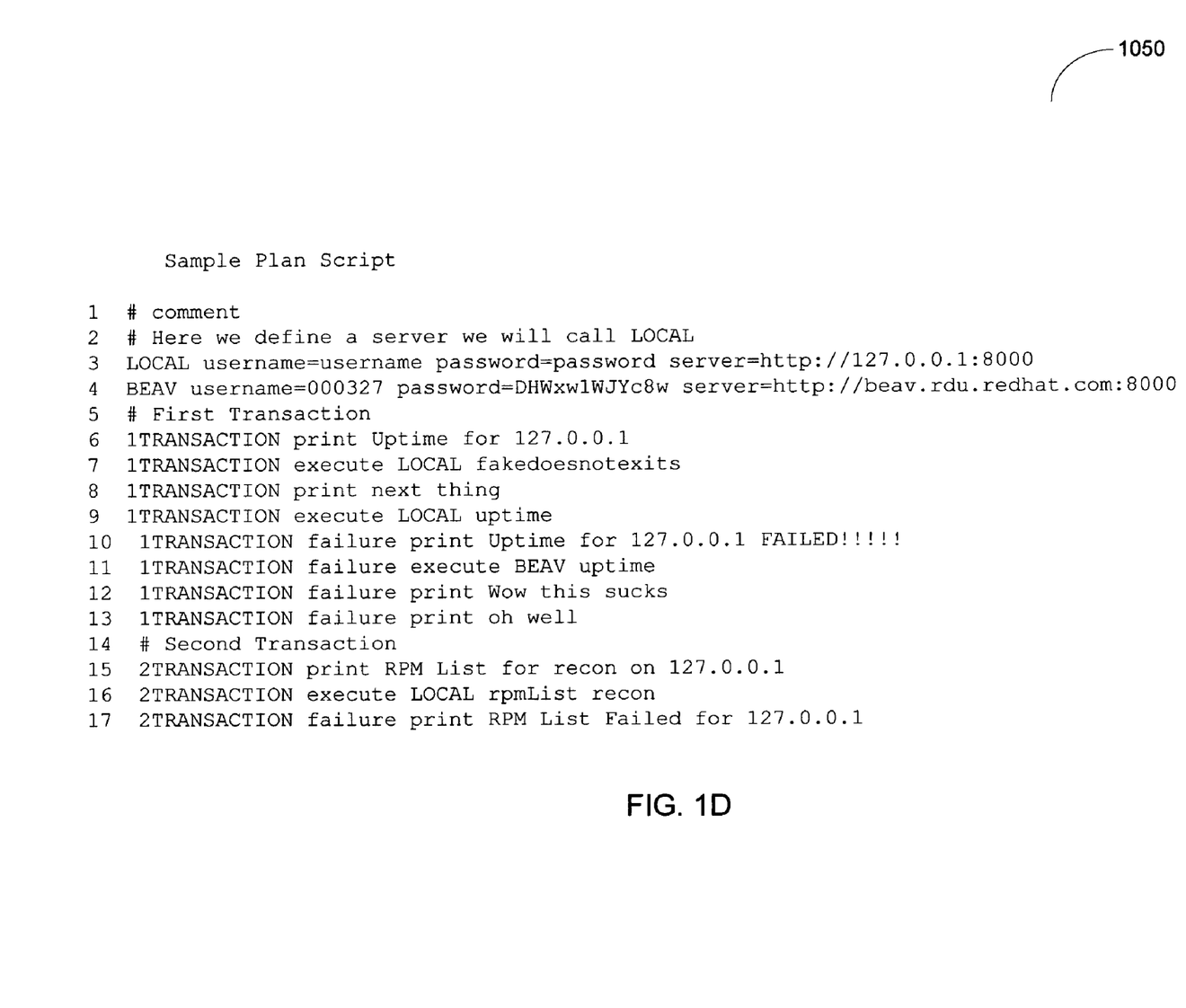
FIG. 1D illustrates one exemplary plan script.

In some embodiments, a plan script may include instructions for one or more transactions to interact with software executable on the servers (e.g., to install new software, to upgrade existing software, to query a database, to manipulate a logical object, etc.). In some embodiments, there are one or more main transaction instructions for each transaction. Furthermore, a transaction may further include one or more failure transaction instructions. One sample plan script 1050 is shown in FIG. 1D. The plan script 1050 includes instructions for two transactions. The instructions for the first transaction are from line six to line thirteen, and the instructions for the second transaction are from line fifteen to line seventeen. For the first transaction, there are main transaction instructions on lines six through nine and failure transaction instructions on lines ten through thirteen. Processing logic uses the interpreter to translate these instructions in the plan script 1050 into commands in a cross-platform language.

After the plan script has been translated, processing logic sends a command corresponding to a main transaction instruction to the servers via RPC, such as Extensible Markup Language-RPC (XML-RPC) (processing block 118). The servers may execute the command. Processing logic receives the result of the execution from the servers (processing block 120). Then processing logic determines if the execution has succeeded or failed (processing block 122). If the execution has succeeded, processing logic further checks if the current transaction has been completed (processing block 124). If there are no more commands to be executed for the current transaction, then the current transaction is completed, and processing logic transitions to processing block 134. Otherwise, processing logic goes to the next main transaction instruction of the current transaction in the plan script (processing block 126). From processing block 126, processing logic transitions back to processing block 118 to repeat the above operations for the next main transaction instruction.

As discussed above, if there are no more commands to be executed for the current transaction, then the current transaction is completed, and processing logic transitions to processing block 134. Processing logic checks to determine if there are any more transactions in the plan script (processing block 134). If not, then the process ends. If there is at least one more transaction, then processing logic moves onto the next transaction (processing block 136). From processing block 136, processing logic transitions back to processing block 118 to repeat the above operations for the next transaction.

In some embodiments, the instructions of a transaction include one or more failure transaction instructions. If processing logic determines that the execution of a command corresponding to a main transaction instruction has failed in processing block 122, then processing logic goes to the failure transaction instructions for the current transaction (processing block 130). Processing logic sends commands corresponding to the failure transaction instructions to the servers via RPCs (processing block 132). After sending the commands corresponding to all the failure transaction instructions of the current transaction, processing logic goes into processing block 134 to determine if there is at least one more transaction and continues with the process as discussed above.

FIG. 1B illustrates one embodiment of a process to respond to a command in software release. The process may be performed by processing logic that may comprise hardware (e.g., circuitry, dedicated logic, programmable logic, microcode, etc.), software (such as instructions run on a processing device), firmware, or a combination thereof. For example, the servers 320A-320D shown in FIG. 3 may perform at least part of the process.

Processing logic receives a command from a release apparatus during a software release (processing block 150). The command may be sent from a release apparatus via RPC. As discussed above, the release apparatus may send the command in response to executing a client application. Alternatively, the command may be generated from an instruction in a plan script processed by the release apparatus. Processing logic executes the command (processing block 152). After executing the command, processing logic sends result of the execution to the release apparatus (processing block 154).

Figure 2:
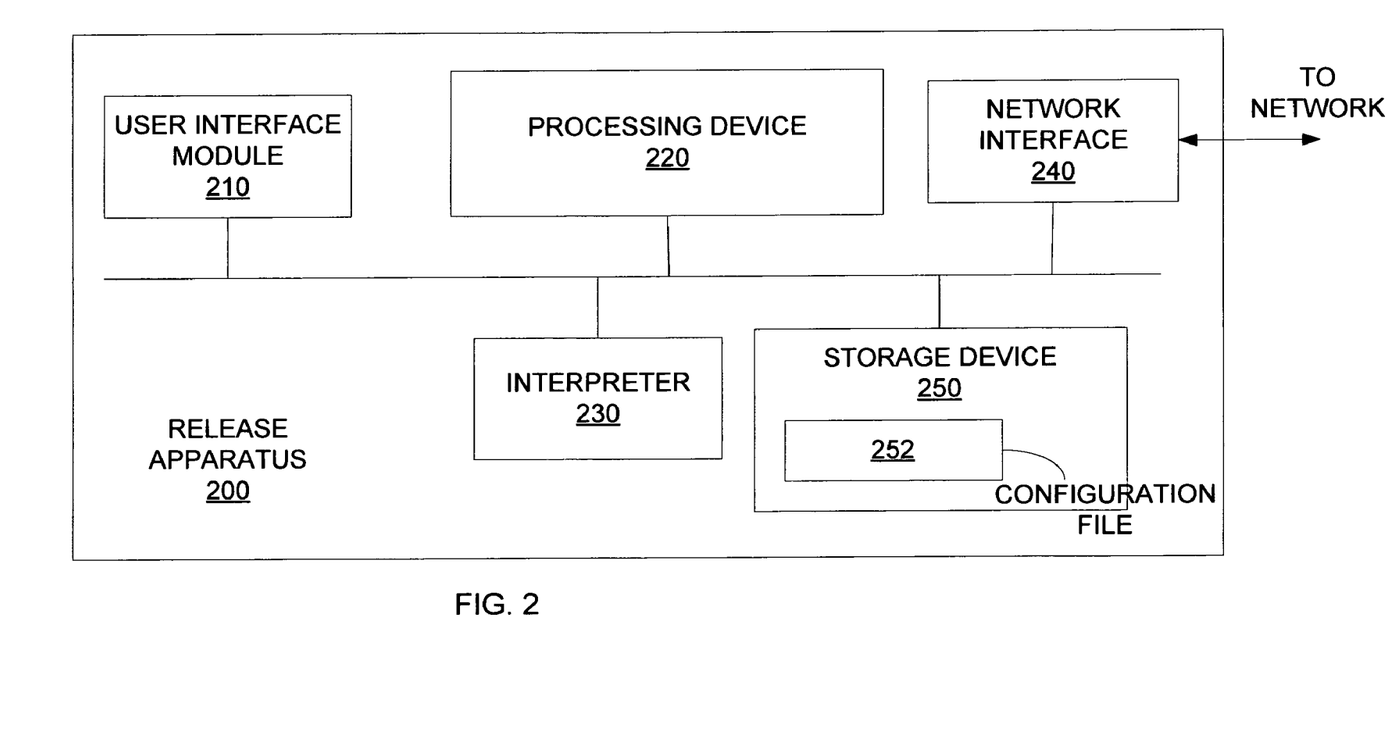
FIG. 2 illustrates a functional block diagram of one embodiment of a release apparatus.

FIG. 2 illustrates a functional block diagram of one embodiment of a release apparatus. The release apparatus 200 includes a user interface module 210, a processing device 220, an interpreter 230, a network interface 240, and a storage device 250, which are operatively coupled to each other. The user interface module 210 generates a user interface (e.g., a graphical user interface, a command line interface, etc.) to receive user input. For example, the user may input a request to conduct software release. In addition, the user may input a client application or a plan script. The user interface may be presented via a display device operatively coupled to the release appatarus 200. Alternatively, the user interface may be sent to a remote machine via the network interface 240 to be presented via a network access application (e.g., a special-purpose network access application for releasing software, a general-purpose network access application, such as a web browser, etc.) running on the remote machine.

In some embodiments, where the user provides a client application, the processing device 220 may execute the client application to conduct the software release. For example, the client application may cause the processing device 220 to send commands to multiple servers having different platforms via RPCs. Because the servers have different platforms, the commands may be written in a cross-platform language, such as Python. An exemplary embodiment of a client application is shown in FIG. 1C.

Alternatively, the user may input a plan script, which is translated by the interpreter 230. Specifically, the interpreter 230 may translate instructions in the plan script into commands in a cross-platform language so that the commands can be sent to the servers with different platforms via RPCs. An exemplary embodiment of a plan script is shown in FIG. 1D.

The network interface 240 communicatively couples the release apparatus 200 to the servers via a network. Through the network interface 240, the commands in the cross-platform language are sent via RPCs to the servers.

The release apparatus 200 may be implemented on a variety of machines (e.g., servers, workstations, personal computers, etc.) and may sometimes be referred to as a "server" or a "client." In some embodiments, the release apparatus 200 is implemented on an XML-RPC server in a standalone mode or an apache cgi-bin mode. The release apparatus 200 may read a configuration file 252 from the storage device 250 for the release apparatus' user and server type configuration. The configuration file 252 may include one or more user-password pairs for authentication. To run the release apparatus 200 in standalone mode, the server needs to have a package manager (e.g., Red Hat Package Manager (RPM) available from Red Hat, Inc. of Raleigh, N.C.) installed. Alternatively, the release apparatus 200 may be run in the apache cgi-bin mode as an apache cgi-bin script, where it is not necessary to have another open port to implement the XML-RPC server.

Figure 3:
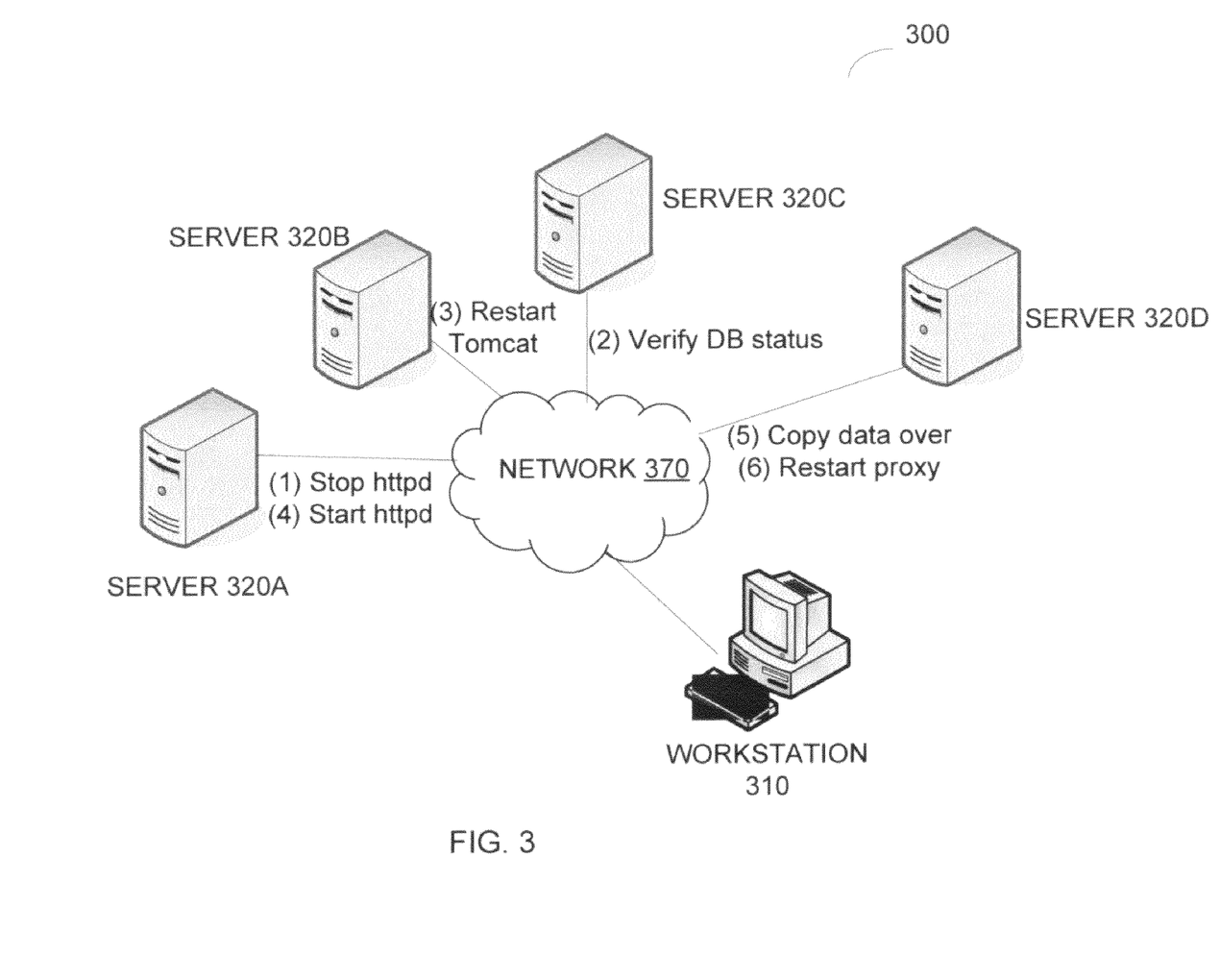
FIG. 3 illustrates one embodiment of a system in which embodiments of the present invention may be implemented.

FIG. 3 illustrates one embodiment of a system in which embodiments of the present invention may be implemented. The system 300 includes a workstation 310, a network 370, and a number of servers 320A-320D. The servers 320A-320D are communicatively coupled to the workstation 310 via the network 370. Furthermore, the network 370 may include different types of network, such as local area network (LAN), wide area network (WAN), etc. Note that the servers 320A-320D may have different platforms, such as Linux, Microsoft Windows, Mac OS X, etc. The workstation 310 implements a release apparatus, such as the release apparatus 200 shown in FIG. 2.

In general, the workstation 310 may receive a user request to conduct software release to the servers 320A-320D. In response to the request, the workstation 310 may send commands in a cross-platform language via RPCs to the servers 320A-320D in order to deploy the software to the servers 320A-320D. The commands may be based on a client application or a plan script of instructions as discussed above. To further illustrate the concept, some exemplary operations are discussed in details below.

Referring to FIG. 3, the workstation 310 sends a "Stop httpd" command to the server 320A to stop a web server daemon (1). Then the workstation 310 sends another command to the server 320C to verify database status (2). Next, the workstation 310 sends another command to the server 320B to restart Tomcat (3). Then the workstation 310 sends a command to the server 320A again to start the web server daemon (4). The workstation 310 then sends commands to the server 320D to copy data over (5), and then to restart a proxy (6). Note that the above commands (1)-(6) may be sent for a single transaction, but the servers 320A-320D may have different platforms. So, without the release apparatus implemented on the workstation 310 to automatically generate the commands in a cross-platform language and send the commands to the servers 320A-320D, the user has to manually log onto each of the servers 320A-320D and submit the commands in accordance to the practice and/or requirement of each of the platforms running on the servers 320A-320D in order to conduct the software release. Moreover, the above process may be readily repeated at another time and/or on another set of servers using the release apparatus implemented on the workstation 310.

Figure 4:
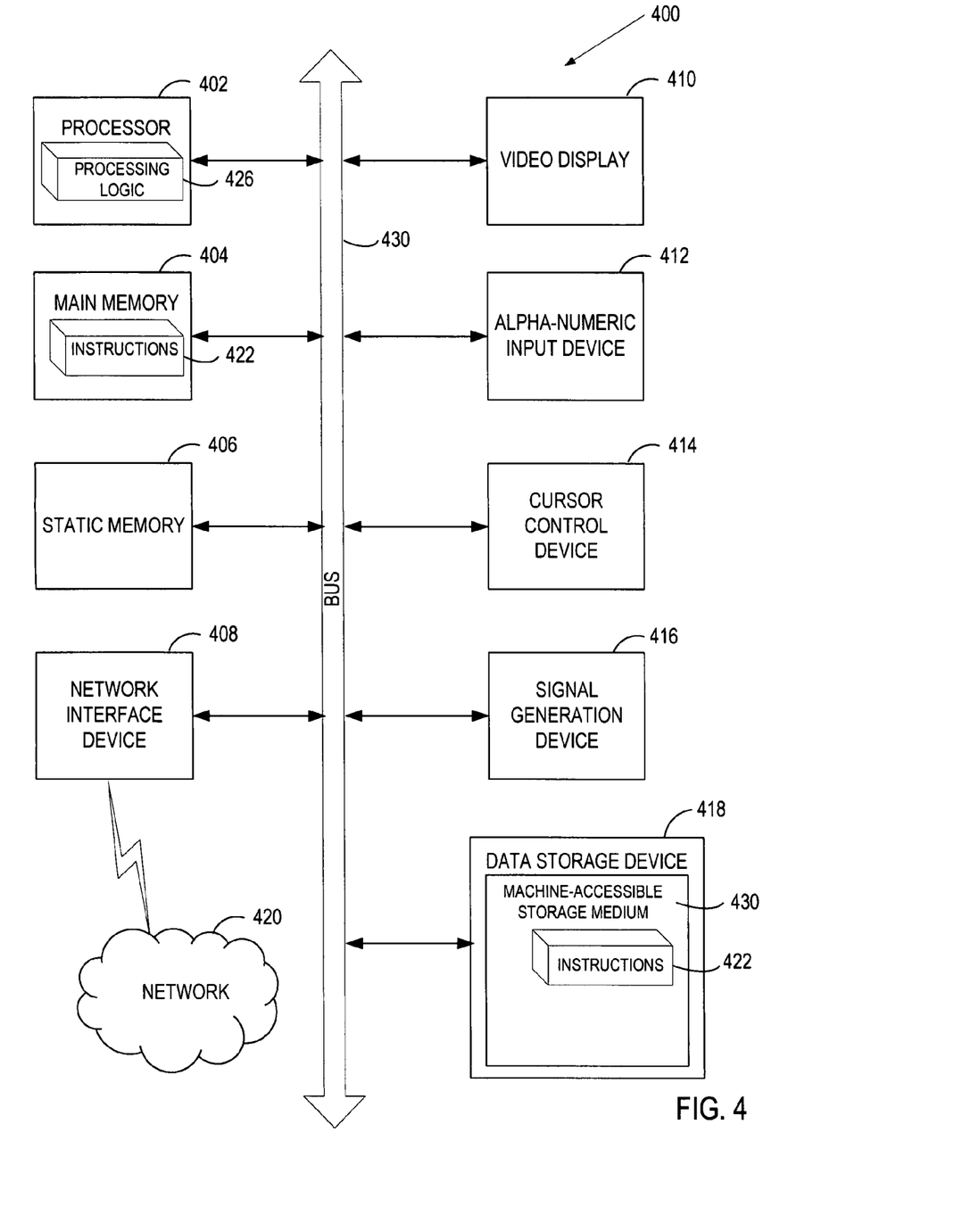
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to conduct software release have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    receiving a request to conduct a software release on a plurality of servers from a user, each of the plurality of servers having a distinct platform, the software release to distribute a new or upgraded version of computer software;
    receiving a plan script from the user, the plan script comprising a plurality of instructions;
    translating the plurality of instructions in the plan script into a plurality of commands in a cross-platform language; and
    in response to the request, sending the plurality of commands in the cross-platform language to the plurality of servers via remote procedure calls (RPCs) in a transactional format to conduct the software release.

2. The method of claim 1,
    wherein the plan script comprises a set of one or more main transaction instructions for a transaction and a set of one or more failure transaction instructions for the transaction, and wherein the method further comprises:
    sending the set of one or more failure transaction instructions to one of the plurality of servers if the one of the plurality of servers fails in executing at least one of the set of one or more main transaction instructions.

3. The method of claim 1, further comprising:
    executing a client application on a release server to cause the release server to send the plurality of commands the plurality of servers.

4. The method of claim 1, wherein the cross-platform language is Python.

5. The method of claim 1, further comprising:
    generating a user interface, which is accessible over a network, to receive input from the user, said input comprising at least one of a command to execute a client application for controlling the software release and the plan script.

6. An apparatus comprising:
    a user interface to receive a request to conduct a software release on a plurality of servers from a user, the software release to distribute a new or upgraded version of computer software, each of the plurality of servers having a distinct platform and to receive a plan script from the user;
    an interpreter coupled to the user interface to translate a plurality of instructions in the plan script into a plurality of commands in a cross-platform language; and
    a processing device coupled to the user interface to send the plurality of commands in the cross-platform language to the plurality of servers via remote procedure calls (RPCs) in a transactional format in response to the request to conduct the software release.

7. The apparatus of claim 6, wherein the plan script comprises a set of one or more main transaction instructions for a transaction and a set of one or more failure transaction instructions for the transaction, and wherein the processing device is operable to send the set of one or more failure transaction instructions to one of the plurality of servers if the one of the plurality of servers fails in executing at least one of the set of one or more main transaction instructions.

8. The apparatus of claim 6, wherein the processing device is operable to execute a client application to send the plurality of commands to the plurality of servers.

9. The apparatus of claim 6, wherein the cross-platform language is Python.

10. The apparatus of claim 6, further comprising:
    a network interface to communicatively couple to a network to receive input from the user, said input comprising at least one of a command to execute a client application for controlling the software release and the plan script.

11. The apparatus of claim 6, wherein the user interface comprises a graphical user interface displayable via a network access application.

12. A system comprising the apparatus of claim 6, further comprising:
    the plurality of servers.

13. A non-transitory machine-readable medium that provides instructions that, when executed by a processor, will cause the processor to perform operations comprising:
    receiving a request to conduct software release on a plurality of servers from a user, each of the plurality of servers having a distinct platform, the software release to distribute a new or upgraded version of computer software;
    receiving a plan script from the user, the plan script comprising a plurality of instructions;
    translating the plurality of instructions in the plan script into a plurality of commands in a cross-platform language; and
    in response to the request, sending the plurality of commands in the cross-platform language to the plurality of servers via remote procedure calls (RPCs) in a transactional format to conduct the software release.

14. The non-transitory machine-readable medium of claim 13, wherein the operations further comprise:
    plan script comprises a set of one or more main transaction instructions for a transaction and a set of one or more failure transaction instructions for the transaction, and wherein the operations further comprise:
    sending the set of one or more failure transaction instructions to one of the plurality of servers if the one of the plurality of servers fails in executing at least one of the set of one or more main transaction instructions.

15. The non-transitory machine-readable medium of claim 13, wherein the operations further comprise:
    executing a client application on a release server to cause the release server to send the plurality of commands the plurality of servers.

16. The non-transitory machine-readable medium of claim 13, wherein the cross-platform language is Python.

17. The non-transitory machine-readable medium of claim 13, wherein the operations further comprise:
    generating a user interface, which is accessible over a network, to receive input from the user, said input comprising at least one of a command to execute a client application for controlling the software release and the plan script.

\* \* \* \* \*